Jan. 8, 1924.  1,480,371
A. CATTONI
APPLIANCE FOR SETTING AND REMOVING TIRES
Filed March 7, 1922
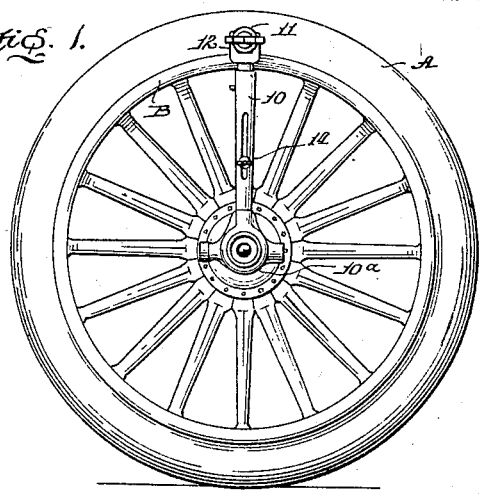
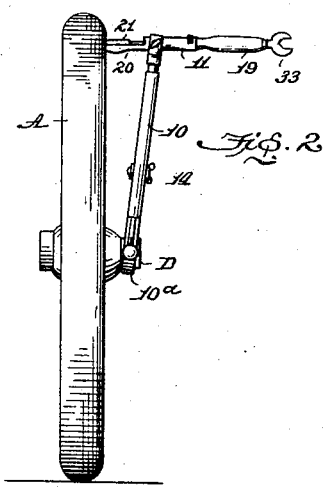
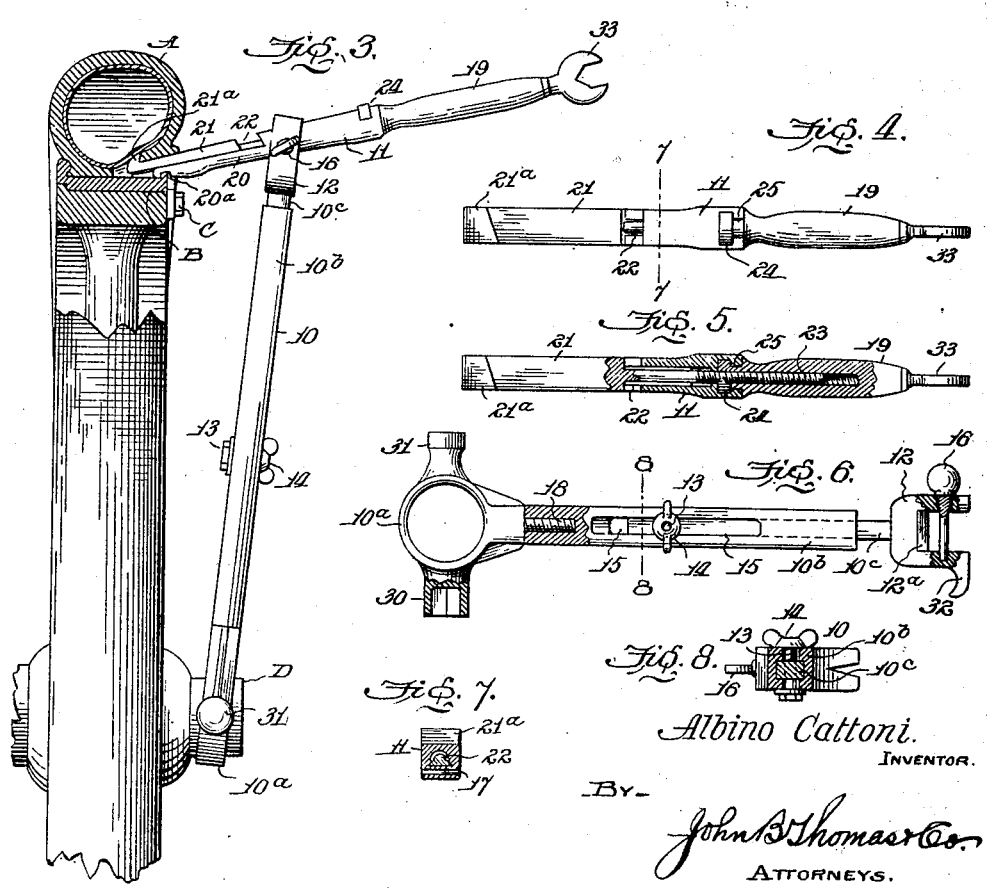
Albino Cattoni.
INVENTOR.
By John B Thomas & Co.
ATTORNEYS.

Patented Jan. 8, 1924.

1,480,371

UNITED STATES PATENT OFFICE.

ALBINO CATTONI, OF BRADFORD, PENNSYLVANIA.

APPLIANCE FOR SETTING AND REMOVING TIRES.

Application filed March 7, 1922. Serial No. 541,848.

*To all whom it may concern:*

Be it known that I, ALBINO CATTONI, a citizen of the United States, residing at Bradford, in the county of McKean and State of Pennsylvania, have invented an Appliance for Setting and Removing Tires, of which the following is a full and complete specification.

My invention relates to that particular class of mechanical appliances which are adapted for the special purpose of setting and removing pneumatic tires from the rims of automobile wheels.

The primary object of my invention is to provide a set of combination tools designed for the particular purpose of cooperating to form an appliance that will facilitate the operation of setting and removing automobile tires, the peculiar construction of said cooperating tools or members of the appliance being such that when separated from each other they provide implements useful for other work about an automobile.

With this primary object in view my invention contemplates an appliance for the purposes mentioned comprising an adjustable supporting member adapted to be mounted for rotation about the hub of the wheel and a tire engaging member pivoted in the upper end of said supporting member and having a pair of opposite jaws one of which engages and holds to the rim of the wheel while the other is slidable to pass under the tire and loosen the same from the rim; whereby when the appliance is then swung around the wheel with its axis on the hub the aforesaid tire-engaging member will loosen the tire entirely so that it may be easily removed; all as hereinafter fully described.

In the accompanying drawings:

Fig. 1 is a front view showing the device applied to an automobile wheel.

Fig. 2 is a side view of the same.

Fig. 3 is an enlarged side view illustrating the operation of the device or appliance, the outer portion of the wheel, including the tire, being shown in section.

Fig. 4 is a detail plan view of the member of the appliance which operates directly on the tire.

Fig. 5 is a similar view of said member, part of the same being broken away to show the means of adjustment.

Fig. 6 is a detail view of the member which is mounted on the hub of the wheel.

Fig. 7 is a sectional view on the line 7—7 of Fig. 4.

Fig. 8 is a sectional view on the line 8—8 of Fig. 6.

In carrying out my invention I provide a member 10 having means, as a ring $10^a$, at one end by which it is mounted to rotate on the hub of the wheel from which the tire is to be removed, and provide also a companion member 11 adapted to be fulcrumed in the outer end of the aforesaid member having means which engage the tire and operate to loosen the same from the rim of the wheel.

The member 10 which is supported on the hub of the wheel and carries the other member at its outer end is constructed in two parts adjustable upon each other so that said member may be varied in length to accomodate wheels of different diameters, and for this purpose the member 10 comprises a main or body portion $10^b$ and a rod $10^c$ slidable therein, the rod projecting beyond the outer end of the body portion where it is formed into a yoke 12 in which the member 11 is fulcrumed. The body portion is provided with a rectangular bore extending inwardly from its outer end in which the rod slides, and to secure the adjustment of the parts upon each other a bolt 13 extends through the rod and works in slots 15 in opposite sides of the body portion $10^b$, being clamped against the latter by means of a winged nut 14; but it will be understood, of course, that other means may be employed for maintaining this adjustment or otherwise providing an extensible supporting member. The bottom wall of the yoke 12 at the outer end of this member is oppositely beveled, as indicated at $12^a$ in Fig. 6, to provide a fulcrum for the companion member 11, the latter being also pivotally connected to said yoke by means of a pin 16 threaded through one member of the yoke to engage a recess in the other member thereof after passing through a hole 17 (Fig. 7) in the member 11 of the appliance.

As the ring $10^a$ at the inner end of the member 10 of the appliance should fit snugly over the hub-cap D of the wheel from which the tire is to be removed or upon which one is to be set it is preferable to detachably connect said ring to the member in order that a ring of a different size may be substituted when the appliance is to be used on a wheel having a larger or smaller hub-cap, and for this purpose said ring is provided with a shank 18 threaded into the end of the member. This arrangement also adapts the device for using several rings each provided with a different variety of tools than those shown in the drawings and hereinafter referred to.

The member 11 of the appliance consists of a body portion having a handle 19 at one end and cooperating jaws 20—21 at the other end, one of said jaws, as 20, being fixed and the other slidable thereon. The fixed jaw 20 is provided at the underside of its outer end with a notch 20ª adapted to engage the marginal flange of the wheel-rim B, while the movable jaw 21 has an upwardly projecting hook 21ª which operates under the tire casing A to engage an inner edge thereof, as illustrated in Fig. 3. It will be noted that the hook-end of the movable jaw is tapered so as to more easily pass under the tire-casing, and that the inner end of said hook is formed at an angle to correspond with the disposition of the engaged inner edge of the tire-casing during operation on said tire-casing.

To provide for slidably connecting the jaw 21 to the member 11 or fixed jaw thereof, and for operating said slidable jaw, it is provided with a dovetailed rib 22 fitting in a corresponding groove in the upper side of the fixed jaw and into a recess extending for a short distance into the body portion of the member 11 towards the handle, with a screw-threaded rod 23 formed integrally on the rib and projecting beyond the same into a threaded opening therefor in the handle, and so that the jaw 21 may be moved with respect to the member 11 or fixed jaw thereof when the handle is turned the latter is rotatably connected to the body portion of said member by means of a circular head 24 and connecting shank 25 on the end of the handle engaging in corresponding recesses in the end of the body portion of the member. However, instead of forming the threaded rod on the slidable jaw to work in a threaded recess in the rotatable handle, as herein shown and described, the threaded rod may be formed integrally with the handle and work in a threaded recess in the slidable jaw, or any other conventional arrangement may be provided for operating the slidable jaw; the important feature of this implement or member of the appliance being to provide cooperating jaws one of which will intimately engage the rim of the wheel while the other is operated to engage the tire-casing and loosen the same from said rim. But it will be obvious that by manipulating the sliding jaw by means of the handle the latter permits of a firm grip in applying the required power.

In order that the appliance or two implements comprising the same may be used to advantage for other purposes in removing a tire, as for instance removing the rim clamping-bolts C, tapping the holding-ring (not shown), and for other uses about an automobile, the ring portion of the member or implement 10 is provided at one side with a socket-wrench 30 and at the other side with a hammer-head 31, while the yoke at the other end of said member or implement has a claw 32 formed thereon for convenience in removing cotter-pins, nails, etc. Likewise the member or implement 11 of the appliance is constructed to provide at the outer end of the handle a flat-wrench 33.

The operation of the appliance in removing a tire from its wheel will be readily understood by reference to Figs. 1, 2 and 3 of the drawings, for after the supporting-member 10 has been applied to the hub and adjusted to bring the member 11 at the outer end thereof on a substantial plane with the rim the sliding jaw 21 is retracted and both jaws pushed under the tire until engagement of the jaw 20 with the rim is effected after which the handle 19 is turned to push the slidable jaw further under the tire until the hook 21ª engages an inner edge of the tire-casing; then said sliding jaw is retracted to pull this side of said tire-casing away from the rim during which operation the implement 11 is swung on its fulcrum or pivot to lift the tire-casing and loosen it from the wheel. When the tire is loosened at one point in this manner the appliance is swung around the wheel with the hub as its axis to loosen or pull the tire from the other parts of said wheel. In like manner the appliance may be used in setting or applying a tire, in this operation the pivoted member 11 being tilted upward at its outer end in forcing the tire on the rim.

Having described my invention, I claim:

An appliance for setting and removing tires comprising a member supported from the hub of the wheel and a companion member pivoted to the outer end of the aforesaid member, the last mentioned member consisting of a body portion having a handle at one end and a fixed jaw at the other end, the handle being rotatably connected to the body portion and the fixed jaw provided with a notch at its underside to engage the rim of the wheel, a movable jaw slidable on the fixed jaw and having a hook at its outer end, and a threaded rod extending rearwardly from the movable jaw and engaging a threaded bore in the handle for moving said jaw by means of the handle.

ALBINO CATTONI.